USOO6833962B2

(12) United States Patent
Bergen

(10) Patent No.: US 6,833,962 B2
(45) Date of Patent: Dec. 21, 2004

(54) LIGHT ALTERING DEVICE

(76) Inventor: Richard F. Bergen, 1043 Willits Rd., Ontario, NY (US) 14519-9320

( * ) Notice: Subject to any disclaimer, the term of this patent is extended or adjusted under 35 U.S.C. 154(b) by 145 days.

(21) Appl. No.: 09/728,756

(22) Filed: Dec. 4, 2000

(65) Prior Publication Data

US 2004/0228007 A1 Nov. 18, 2004

(51) Int. Cl.[7] .................. G02B 27/10; G02B 17/00; G01C 7/30
(52) U.S. Cl. .................. 359/626; 359/727; 33/227; 33/DIG. 21
(58) Field of Search .................. 359/618, 621, 359/624, 626, 627, 727; 33/286, 227, DIG. 21

(56) References Cited

U.S. PATENT DOCUMENTS

| | | | | |
|---|---|---|---|---|
| 3,588,249 A | | 6/1971 | Studebaker | 356/4 |
| 3,790,257 A | * | 2/1974 | Goldstein et al. | 359/845 |
| 3,964,824 A | * | 6/1976 | Dixon | 359/710 |
| 4,309,746 A | * | 1/1982 | Rushworth | 359/618 |
| 4,344,671 A | * | 8/1982 | Lang | 359/618 |
| 4,674,870 A | | 6/1987 | Cain et al. | 356/4 |
| 4,679,937 A | | 7/1987 | Cain et al. | 356/138 |
| 4,871,232 A | * | 10/1989 | Grinberg et al. | 359/618 |
| 4,974,957 A | * | 12/1990 | Kaelin | 359/443 |
| 5,237,634 A | * | 8/1993 | Follis | 385/31 |
| 5,550,676 A | * | 8/1996 | Ohe et al. | 359/619 |
| 5,680,257 A | * | 10/1997 | Anderson | 359/727 |
| 5,836,081 A | * | 11/1998 | Orosz, Jr. | 33/DIG. 21 |
| 5,914,778 A | | 6/1999 | Dong | 356/247 |
| 5,940,557 A | | 8/1999 | Harker | 385/33 |
| 5,994,688 A | | 11/1999 | Jackson et al. | 250/206.2 |
| 6,005,717 A | * | 12/1999 | Neuberger et al. | 359/618 |
| 6,005,719 A | | 12/1999 | Rando | 359/629 |
| 6,009,630 A | | 1/2000 | Rando | 33/365 |
| 6,502,319 B1 | * | 1/2003 | Goodrich et al. | 33/286 |
| 6,539,638 B1 | * | 4/2003 | Pelletier | 33/227 |
| 6,540,381 B1 | * | 4/2003 | Douglass, II | 359/567 |

* cited by examiner

Primary Examiner—Georgia Epps
Assistant Examiner—Alicia M. Harrington
(74) Attorney, Agent, or Firm—William A. Henry, II

(57) ABSTRACT

A line producing system includes an input beam of radiant energy that enters a side of a low cost, radiant energy altering device. The radiant energy emerges from the light altering device radiating in a nearly 360 degree disc pattern forming a ring of ever expanding light.

4 Claims, 9 Drawing Sheets

LIGHT ALTERING DEVICE

BACKGROUND OF THE INVENTION

1. Field of the Invention

This invention relates to the field of radiation manipulation. In particular, the invention relates a method and apparatus for altering a beam of light or radiant energy.

2. Description of Related Art

Heretofore, light has been manipulated to produce an alignment field with laser based equipment as shown in U.S. Pat. No. 3,588,249 where a collimated laser beam is rotated 360 degrees about an axis to establish an alignment plane. Remote receivers in the vicinity may detect the laser beam as it sweeps past, and provide a visual or audible indication when they are aligned in the laser plane. While this rotating beacon technique provides results that are quite useful over long ranges, the cost of the mechanical and optical structures for implementing the technique with the desired amount of accuracy is relatively high. Also, the plane is more difficult to locate if the receiver is moved through the plane before the beam strikes its detector.

An improvement is disclosed in U.S. Pat. No. 4,674,870 that includes a laser alignment system employing a transmitter and one or more receivers. The transmitter produces an alignment field by projecting laser energy in a non-planar reference cone, and the receivers locate this reference cone with photodetectors. The laser energy in the alignment field is modulated at 8 kHz and the signals produced by the photodetectors are filtered and amplified to increase the range of the system. Each receiver operates a display, which indicates when it is aligned in the reference cone, and it produces an out-of-level indication when the transmitter is not properly aligned.

A transmitter for an alignment system is shown in U.S. Pat. No. 4,679,937 in which a field of electromagnetic radiation is propagated in a non-planar reference cone. The transmitter includes a source for providing a collimated beam of electromagnetic radiation directed parallel to a beam axis. A cantilever strand supports a bob within the beam. The bob has a conical reflection surface to reflect the collimated beam conically. Optimally, the cantilever stand and bob are chosen to provide a deflection between the bob and plumb which is substantially one-half of any angular error between the beam axis and plumb. In a preferred form, a housing surrounds the bob and has inner and outer surfaces, which minimize temperature effects on the orientation of the reference plane. In addition, detectors are provided to sense when the angular error between the beam axis and plumb is outside of an acceptable range. Other leveling devices are shown in U.S. Pat. Nos. 5,914,778; 5,940,557; 5,994,688; 6,005,719 and 6,009,630.

Obviously, in view of the above prior art, there is still a need for a cost effective level line system.

SUMMARY OF THE INVENTION

Accordingly, in one aspect of the present invention, a low cost, light-altering device in the form of a hollow tube is disclosed for use in an optical level line system. The system includes an input beam of light or radiant energy that enters a side of the hollow glass tube. Light emerges from the tube radiating in a nearly 360 degree disc pattern forming a disc of ever expanding light. When the light strikes an enclosed or circular surface, a bright line or ring of light is produced on the surface. This ring can be generated for X, X and Y, and X, Y, and Z axes, by employing an individual light-altering device per axis, thereby supplying a line or ring for each axis. The lines or rings of light are ideally suited, for example, for laser line leveling applications.

In another aspect of the present invention, an input beam of light or visible radiation enters a side of a light-altering device in the form of a capillary array of small tubes. The light emerges from the array radiating in a nearly 360 degree disc pattern forming a disc of ever expanding light. When the light strikes an enclosed surface, a bright line or ring of light is produced on the surface. This ring can be generated for X, X and Y, and X, Y, and Z axes, by employing an individual light-altering device per axis, thereby supplying a line or ring for each axis.

In a third aspect of the present invention, an input beam of light or visible radiation enters a side of light altering device comprising a fiber optic rod. The light emerges from the rod radiating in a nearly 360 degree disc pattern forming a disc of ever expanding light. When the light strikes an enclosed surface, a bright line or ring of light is produced on the surface. This ring can be generated for X, X and Y, and X, Y, and Z axes, by employing an individual light-altering device per axis, thereby supplying a line or ring for each axis.

In a fourth aspect of the present invention, a low cost, light altering device is disclosed for use in an optical level line system. The system includes an input beam of light or visible radiation that enters a side of the light altering device that includes a hollow tube within a hollow tube. The light emerges from the tubes radiating in a nearly 360 degree disc pattern forming a disc of ever expanding light. When the light strikes an enclosed surface, a bright line or ring of light is produced on the surface. This ring can be generated for X, X and Y, and X, Y, and Z axes, by employing an individual light-altering device per axis, thereby supplying a line or ring for each axis.

These and other features and advantages of the invention are described in or apparent from the following detailed description on the exemplary embodiments.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
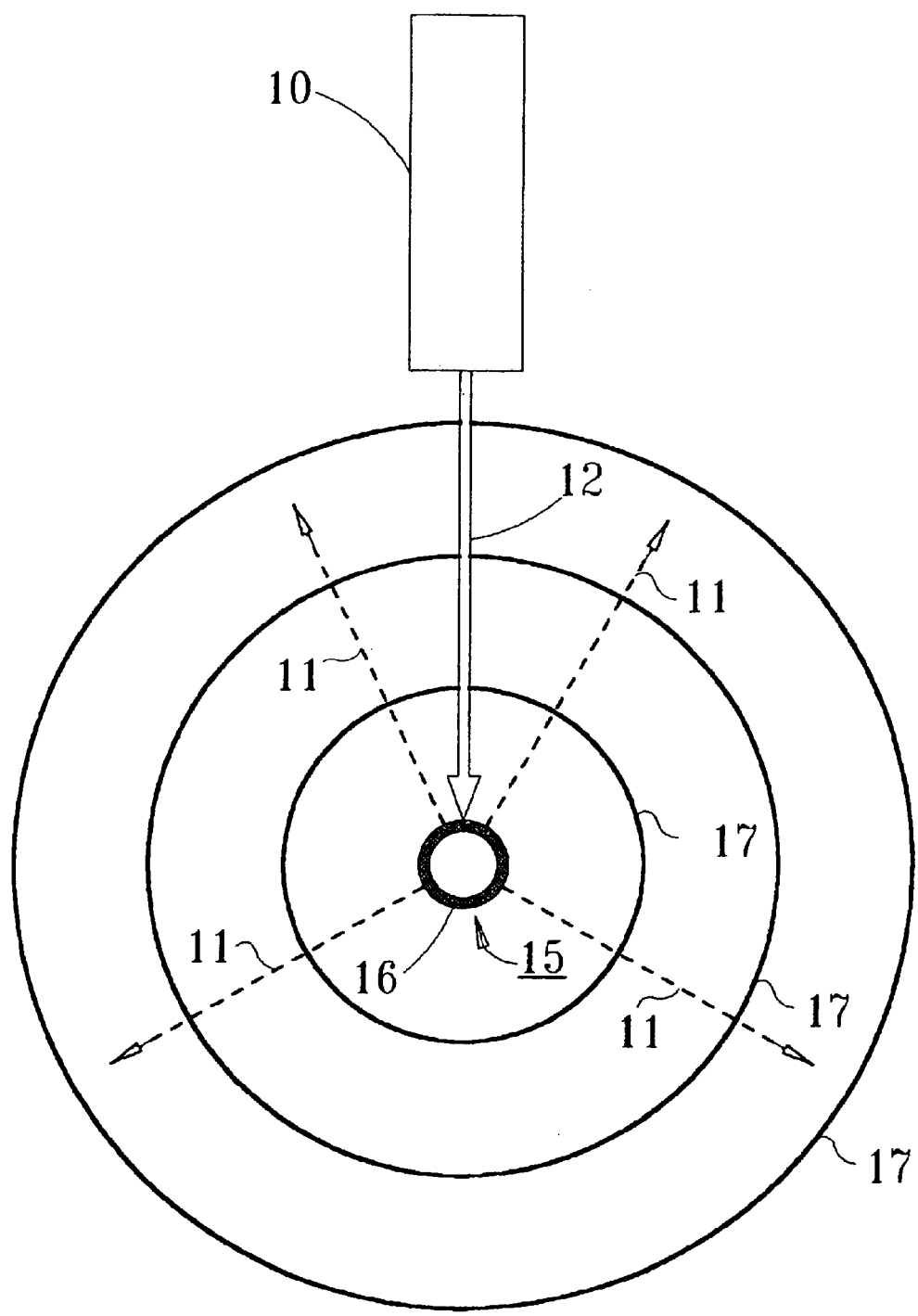
FIG. 1 is a top view of an exemplary embodiment of a light altering device in accordance with the present invention that employs a hollow tube, rod or capillary member(s).

In accordance with the present invention, a novel Light Altering Device (LAD) and method is disclosed to alter a beam of light or radiant energy from laser sources. This LAD dramatically changes an input beam of light or radiant energy's properties. As an example, a laser beam entering the LAD is altered such that the light emerges radiating in a substantially 360 degree disc pattern. This pattern can be obtained employing a variety of materials and geometries. One exemplary embodiment of the present invention employing a LAD is shown in FIG. 1. Here, a laser beam 12 of laser 10 is shown entering the side of a LAD 15 in the form of a hollow glass tube 16. Light emerges from tube 16 radiating in the direction of arrows 11 in a 360 degree disc pattern 17. Thus, a disc is formed of ever emerging light. An enclosure, for example, a circular screen placed a given radius from the tube will allow an observer to view a bright ring of light on the screen surface. In addition, the uniformity of the light distribution around the radius is quite uniform. The light ring still maintains the optical properties of the directed beam. That is, polarization of the directed beam remains the same around the radius of the ring of light. Also, if the directed beam is such that it is focussed to a point 3 meters from where the tube may be inserted, when the tube is inserted the focal point remains relatively unchanged.

A tube 16 made of glass, plastic, gelatin, etc., with the proper diameter, wall thickness, index of refraction, etc., with a red laser input; can produce an emerging dotted ring of red light. That is, a black and red series of dots (dashes) around the disc will result. The interference and/or diffraction properties of light are responsible for this effect.

Figure 2:
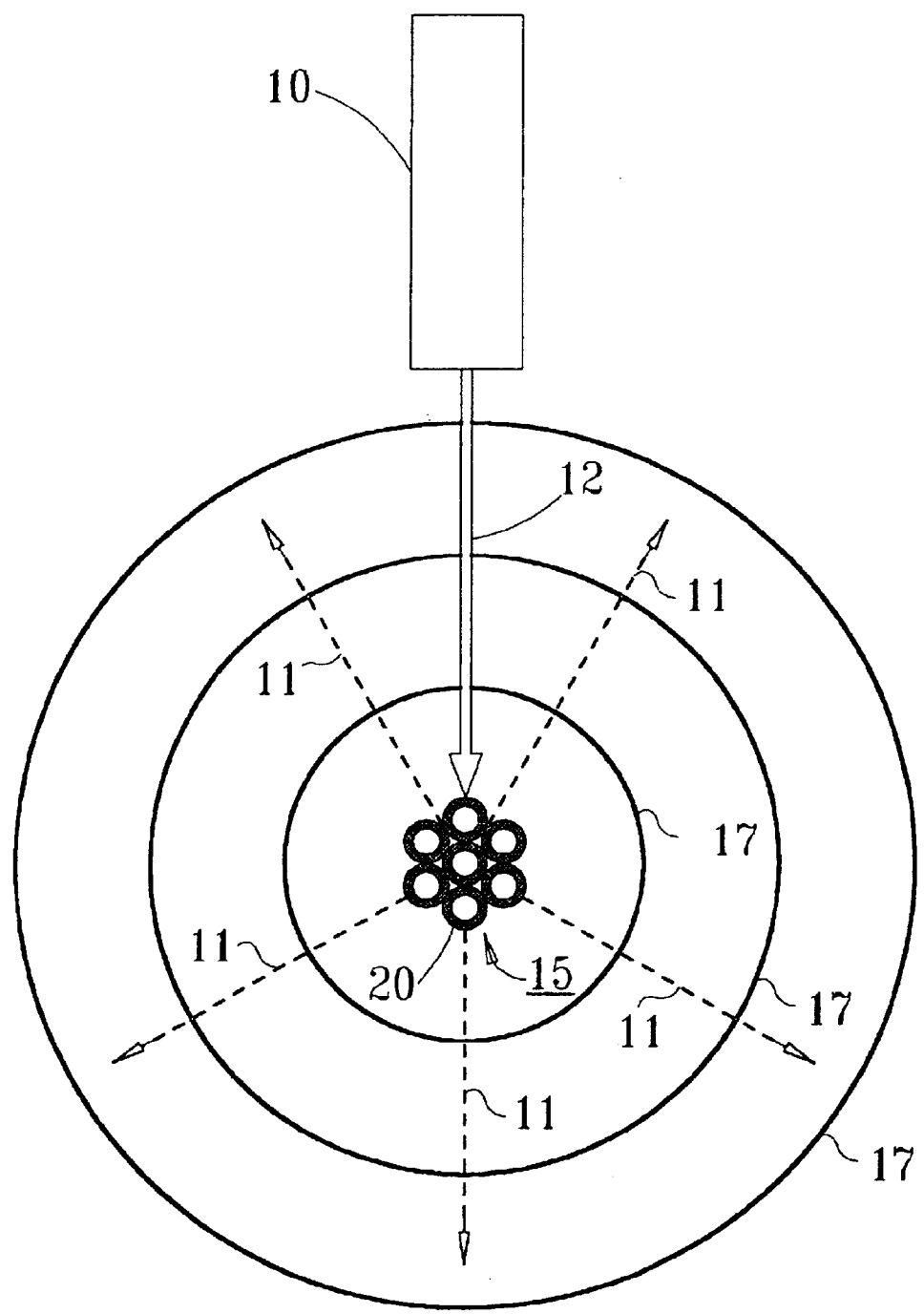
FIG. 2 is a top view of another exemplary embodiment of a light-altering device in accordance with the present invention that employs a capillary array.

In another embodiment of the present invention in FIG. 2, LAD device 15 includes a capillary array 20 of hollow glass tubes. As shown, laser beam 12 of laser 10 enters a side of capillary array 20 with light radiating from the capillary array in a disc pattern of about 360 degrees. Thus, again a disc is formed of ever emerging light 17 in the direction of arrows 11. A circular screen placed a given radius from the array will again allow an observer to view a bright ring of light 17 on a surface of the screen.

Figure 3:
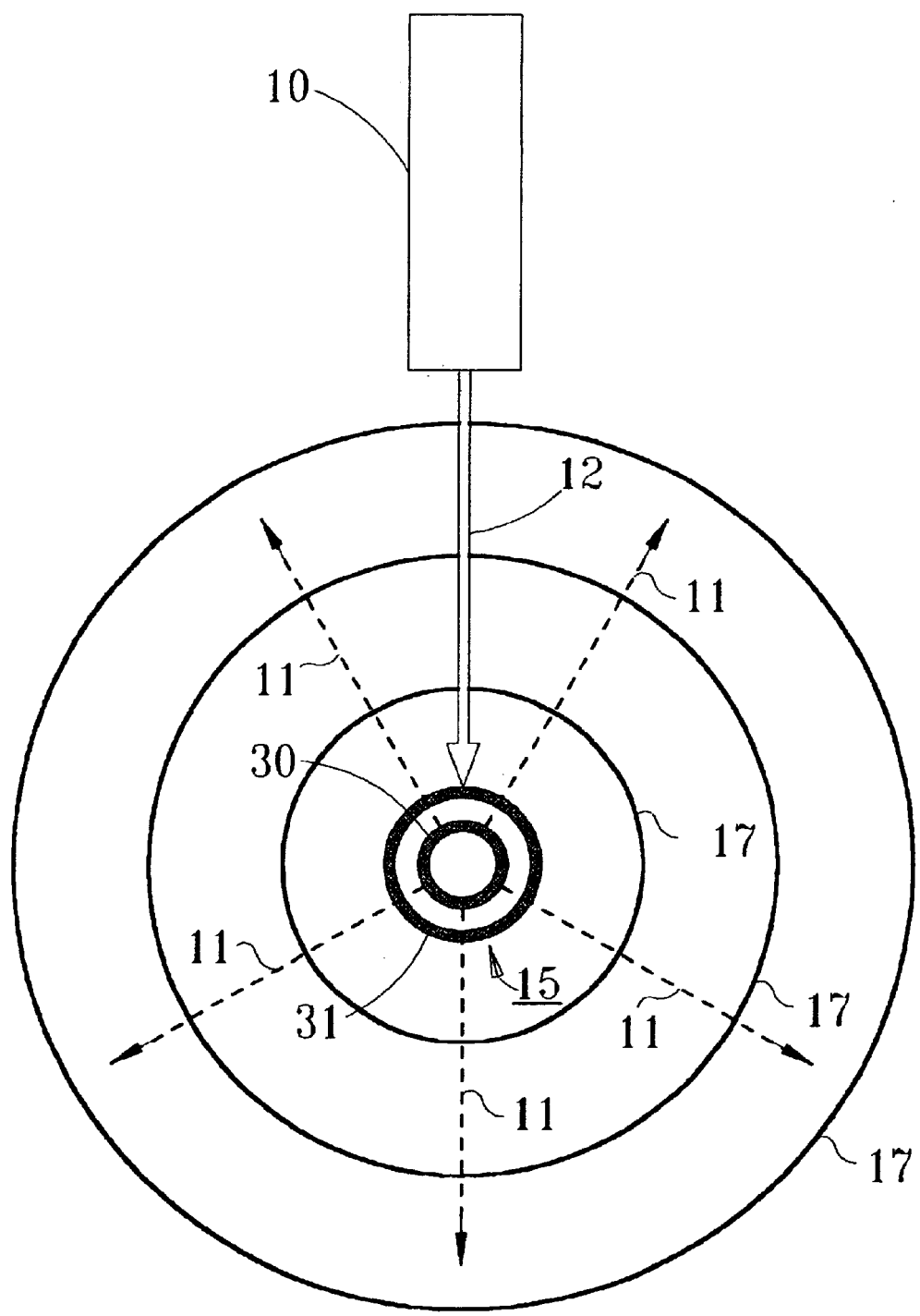
FIG. 3 is a top view of yet another exemplary embodiment of a light altering device in accordance with the present invention that employs a hollow tube within a hollow tube.

In the embodiment of the present invention shown in FIG. 3, laser 10 directs an input laser beam 12 into a surface of LAD 15 which comprises a combination of hollow tubes 30 and 31, with hollow tube 30 placed within hollow tube 31. As a result, light radiates from the hollow tubes 30 and 31 in a disc pattern of approximately 360 degrees forming an ever emerging light 17 in the direction of arrows 11. A circular screen placed a given radius from the tubes will again allow an observer to view a bright ring of light 17 on a surface of the screen.

Figure 4:
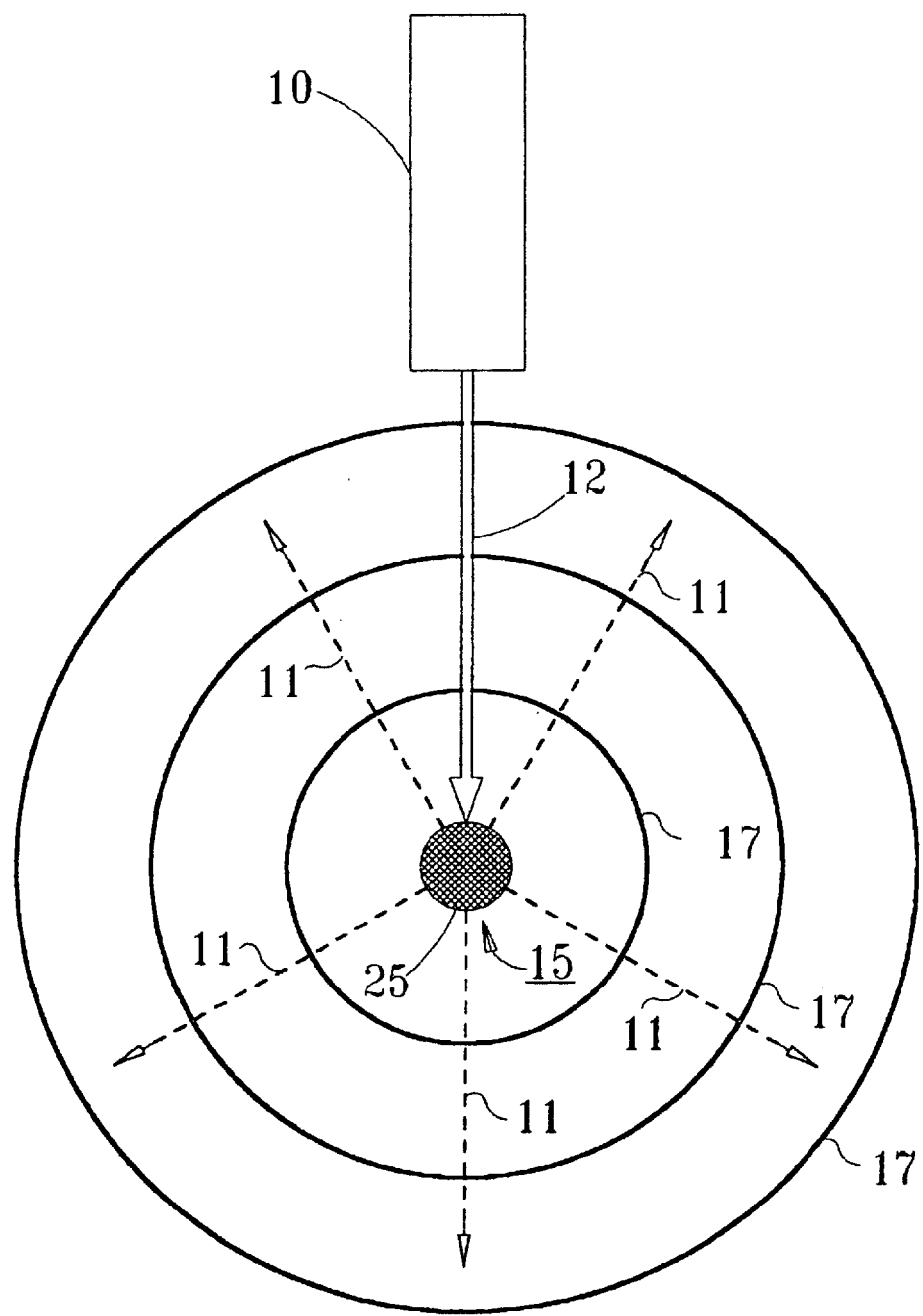
FIG. 4 is a top view of yet another exemplary embodiment of a light altering device in accordance with the present invention that employs a fiber optic rod.

In the embodiment of the present invention shown in FIG. 4, laser 10 directs an input laser beam 12 into a surface of LAD 15 which comprises a fiber optic rod 25. As a result of laser beam 12 striking the surface of fiber optic rod 25, light radiates from the rod in the direction of arrows 11 in a disc pattern of approximately 360 degrees forming an ever emerging ring of light 17. A circular screen placed a given radius from the tubes will again allow an observer to view a bright ring of light 17 on a surface of the screen. A fiber optic rod 6 mm in diameter displays a fairly uniform brightness around the rod where the beam enters. This scattered light seems uniform and so does the emerging beam. However, there is no visible light emerging from either of the polished ends of the rod. Therefore, there is minimal light loss into the fibers, thereby indicating an efficient reflection at the cladding interface. It is believed that there are multiple reflections within and/or around the outside of the fiber optic rod. The light, in this case, reflects off small micron diameter fibers, for example, about 13 microns, all encircling and contained in the ¼ inch diameter fiber optic rod, without a significant drop in light energy. That is, the total power emitted by the fiber optic rod is quite close to the power of the light directed into the rod. However, some scattered light is noticed around the circumference of the rod, but is only as wide as the entering light beam and does not appear to be very significant.

Figure 5:
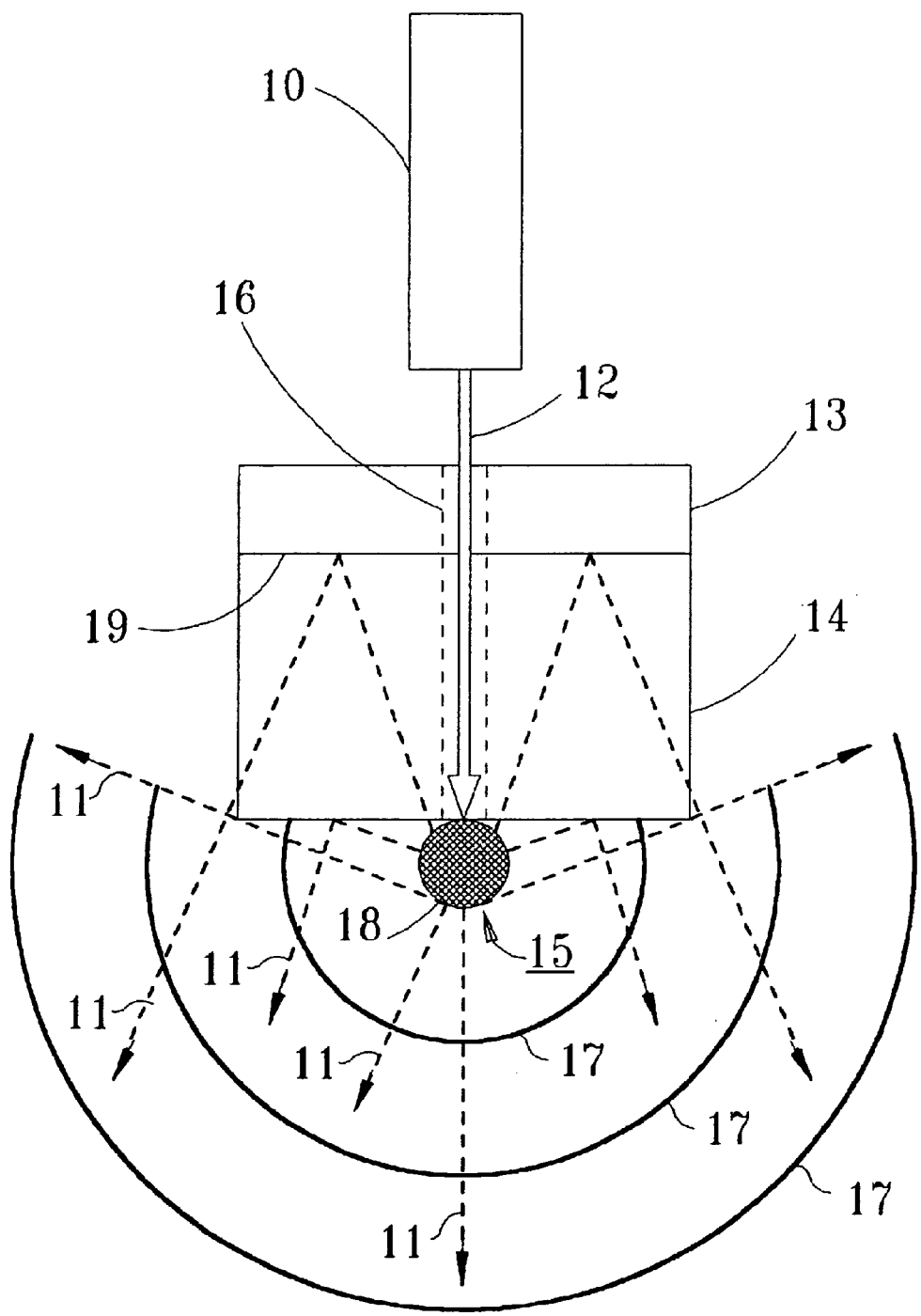
FIG. 5 is a top view of still another exemplary embodiment of a light altering device in accordance with the present invention that employs a gap between a rod and a reflecting plane.

A method for efficiently utilizing almost all of the light generated, while providing a beam over 180 degrees or so, is accomplished by employing a light altering-device in contact with a glass surface contacting a mirror with a hole through it. In the embodiment of the present invention shown in FIG. 5, a laser 10 directs a laser input beam 12 through a channel 16 cut through mirror 13. Laser beam 12 enters a glass member 14 as it is directed towards LAD 15 in the form of a fiber optic rod 18. Glass 14 serves as a spacer member to force a controlled and parallel gap between LAD 15 in the form of fiber optic rod 18 and reflecting plane 19 of mirror 13. As shown by arrows 11, some light is reflected off the glass surface, while other rays of light are directed toward the mirror, striking the mirror, and reflecting off the mirror in multiple directions whereby it is multi-reflected to provide an emerging semi-circular beam of 180 degrees, or so. All of these reflections occur in the same plane that the beam strikes the LAD. Of course, using a mirror without a hole or channel can be employed by aiming the laser-input beam directly at the LAD from the side. That is, at an angle slightly greater than 90 degrees from the laser beam 12 shown in FIG. 5.

It should be understood that other methods may be employed to alter light beams for special purposes or special results. For example, to improve beam uniformity about its circumference, mirrored coatings may be applied to the appropriate regions on the outer surfaces of the rod or tube(s) to direct light to the less bright regions of the beam. Also, the altering of the cross-sectional shape of the rod or tube to be oval spherical or have a flat areas on the circumference, etc., can provide special beneficial light patterns.

LAD units may also employ light sources other than lasers for illumination sources. This can include point or line sources, single colors, white light, etc. In fact, for special applications, multiple laser or light sources can be employed such that each individual source is aimed directly into a single LAD, without the light losses typically associated with uniting multiple light beams.

Figure 6:
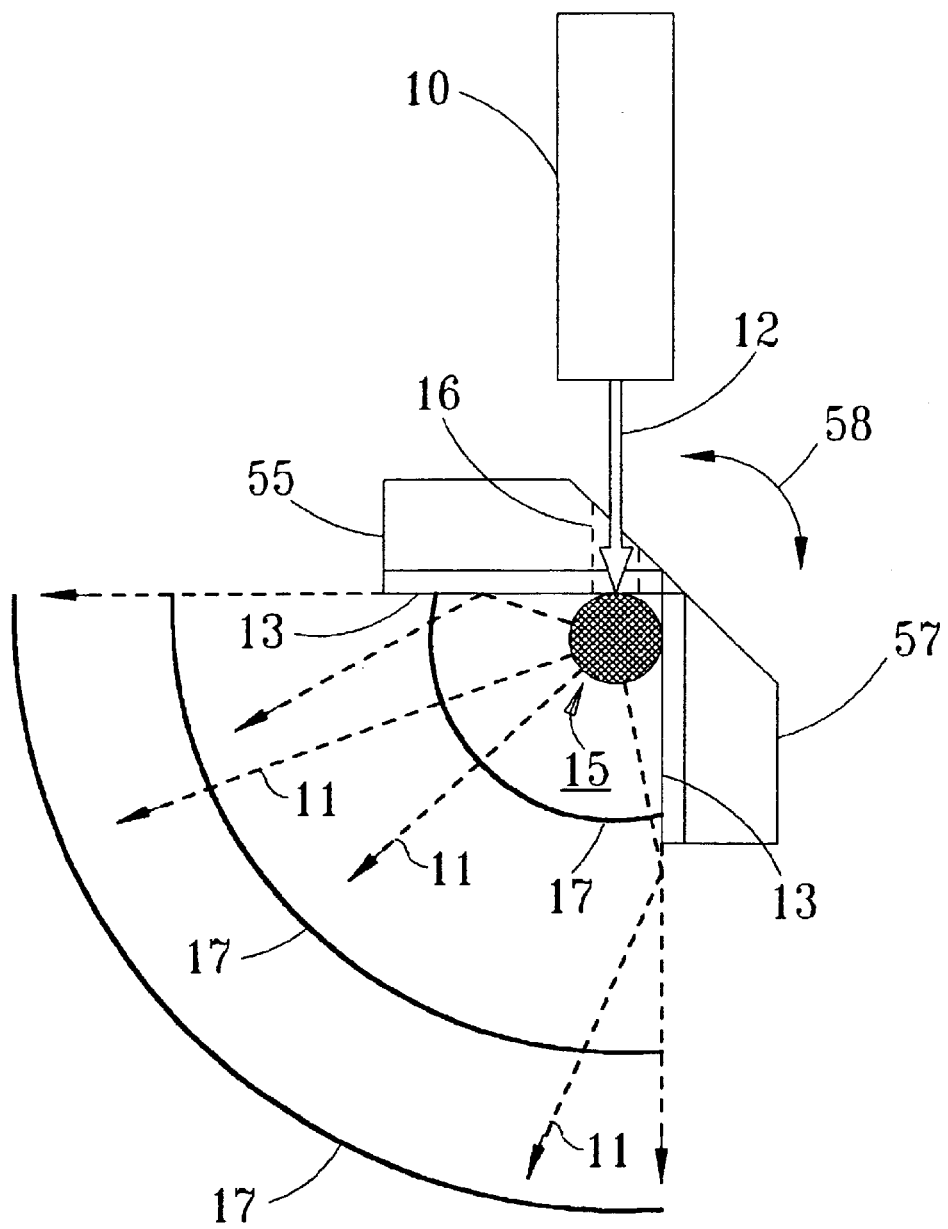
FIG. 6 is a top view of another embodiment of the present invention that is adaptable to produce a light reference plane of less than 360 degrees.

Hereinbefore, a LAD has been described that produces nearly a 360 degree circle of light. In some instances, there are times when it is preferable to employ only a portion of a circle of light, for exile, 90 to 180 degrees for line making purposes. In those instances, the embodiment of the present invention shown in FIG. 6 is employed that comprises a substrate 55 with a channel 16 therein and is aligned to another substrate 57 orthogonally. LAD 15 is positioned at an intersection of substrates 55 and 57 on top of a mirrored face 13 of the substrates. In this configuration, a 90 degree portion of a circle is created by a beam 12 from laser 10 applied through channel 16 in substrate 55. The laser beam contacts LAD 15 and light emerges from the LAD, as shown by lines 17, initially in all directions as shown by arrows 11. However, mirrors 13 redirect the light such that it is contained approximately within the 90 degrees formed by the mirrors. By moving mirror 57 relative to mirror 55 a larger angular coverage can be attained as shown by arrow 58. It should be understood that substrates 55 and 57 could be made of glass with mirrors 13 being placed on the opposite face of the substrates.

Figure 7:
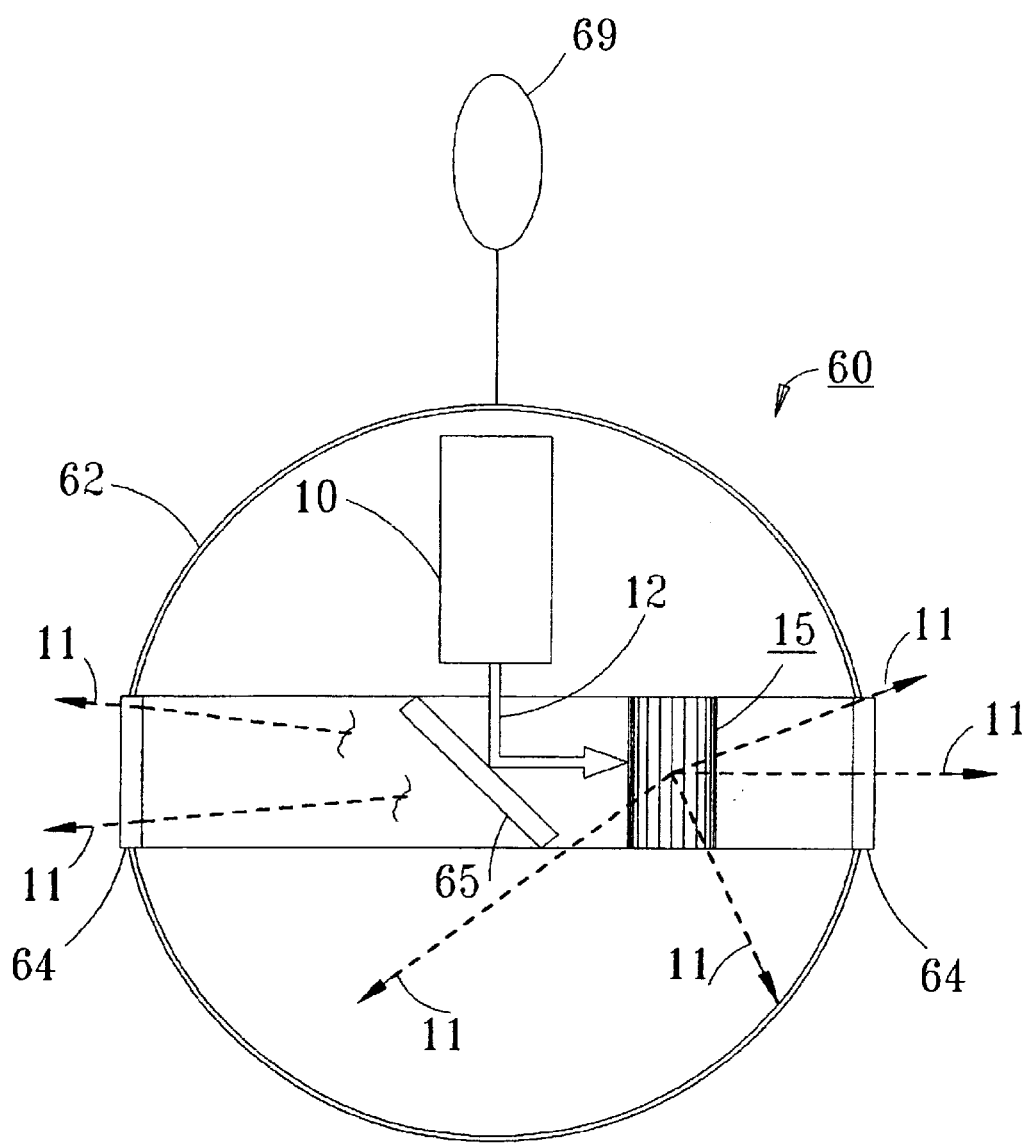
FIG. 7 is a side view of a light-altering device in accordance with the present invention that employs a plumb bob.

In FIG. 7, a plumb bob laser leveling apparatus 60 is shown that includes a LAD 15 positioned within plumb bob 62. Spherical plumb bob 62 is fashioned having two hemispheres separated by a narrow transparent member 64 which encompasses the 360 degrees of the sphere's equator. A LAD 15 is positioned within the space provided between the two halves of the bob in order to provide a circle of light. The bob can be suspended from a string, a flat metal tape, e.g., a measuring tape in conjunction with a metal ring 69, or attached to a wall, suspended from a door frame or ceiling, or operate hanging from a cross arm rod attached to a base or cantilevered from the base resting on a floor. The bob can have most any shape and is unique in that it automatically rests in a straight down position. This principle dictates that a plane cut through the bob orthogonal to the string direction can be useful for floor leveling. Thus, a LAD unit properly aligned/positioned within the bob allows the LAD to produce a circle of light for reference purposes, e.g., to achieve floor flatness. While it is preferred to center the weight distribution of the laser and LAD within the housing of the bob and spacer members, it may not be critical since it should be much less than the mass of the bob. The bob weight can significantly dominate over the weight distribution of the LAD.

Figure 8:
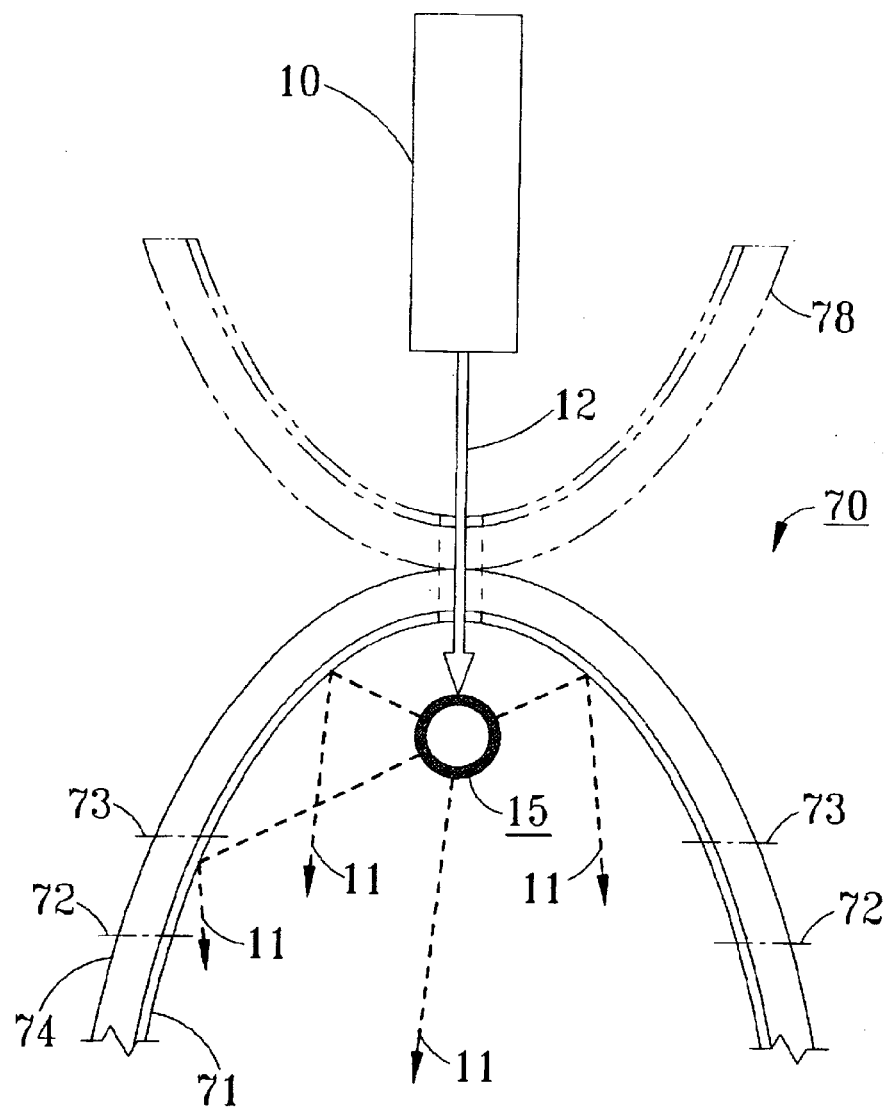
FIG. 8 is yet another embodiment of the light altering device of the present invention employing a concave or convex shaped reflector.

In operation, laser 10 supplies a beam of light 12 onto mirror 65 that deflects the light in a straight line into LAD 15. The laser beam emerges from LAD 15 as an everexpanding ring of light in the direction of arrows 11. For best results, the mirror should be slightly wider than the beam width. Concave and convex cylindrical reflectors can be useful for generating unique light patterns. In the method and apparatus shown in FIG. 8, laser beam 12 of laser 10 passes through a hole in the concave and cylindrical reflector 70 to strike LAD 15. As the ever expanding light emerges in the direction of arrows 79, some of it strikes and reflects off mirrored surface 71 of the concave reflector 70. Mirrored surface 71 is mounted on a glass substrate 74. The remaining light continues until it emerges at an angular extent that is determined by the parameters between the LAD 15 and mirrored reflector 71. That is, altering the reflector's shape, size, focal point, length, curvature, etc., allows for obtaining any desired angular extent required. For example, the reflector's angular extent could be altered by cutting it off at marks 72 and 73. Since the reflected light combines with the emerging light in the same plane, the emerging ring segment brightness is increased and made more uniform. Alternatively, a convex cylindrical reflector 78 shown in dotted lines may be employed to control the angular extent of the emerging light disc and function to give a wider angle of reflection.

Figure 9:
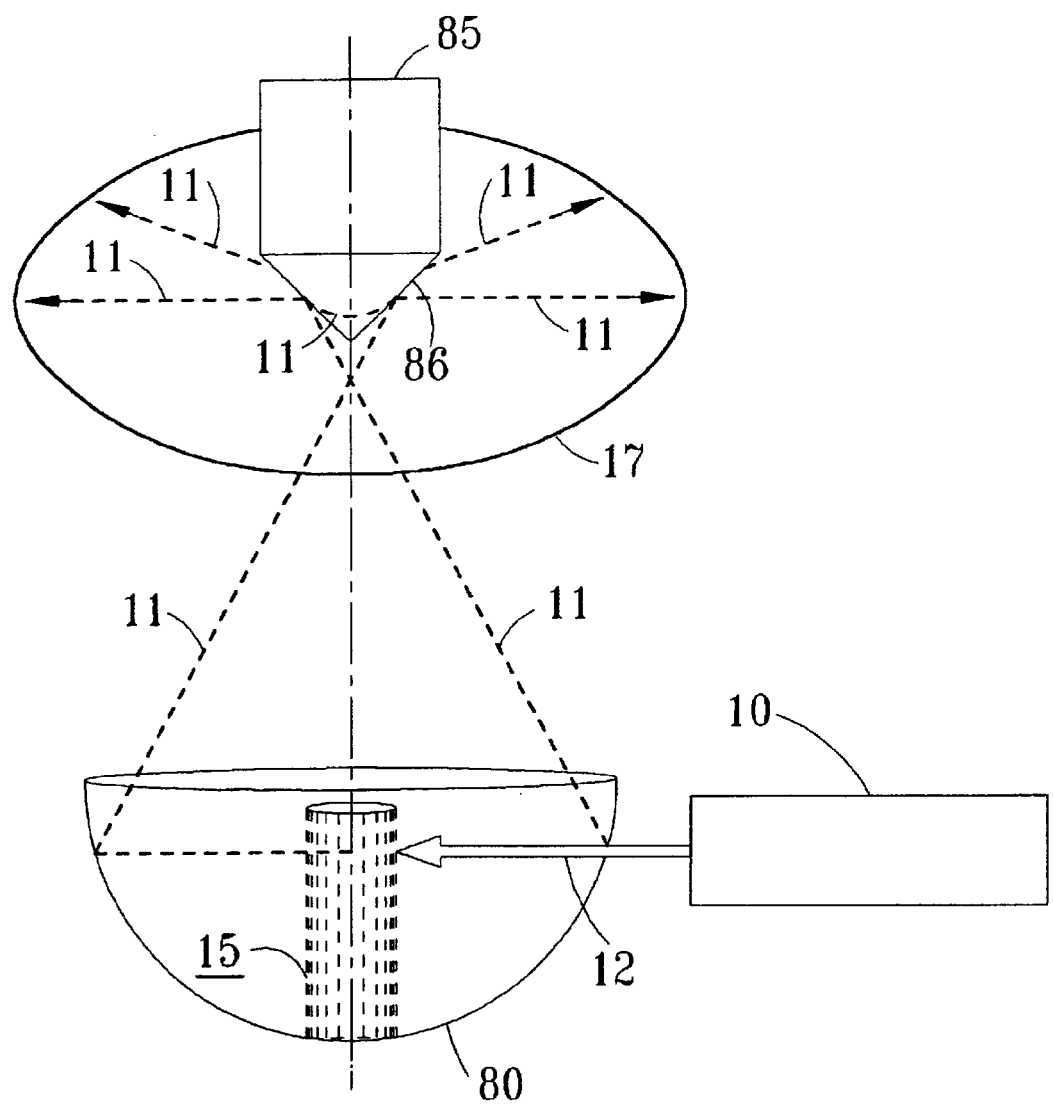
FIG. 9 is an embodiment of a light altering device of the present invention that employs a concave, conical or parabolic reflector having a hole cut in its side to allow the projection of light.

Incorporating a LAD 15 on the optical axis of a concave, conical or parabolic reflector 80 having a slot (or hole) cut into its side is illustrated in FIG. 9. A laser beam 12 from laser 10 is directed through the slot striking LAD 15 producing a ring of light 17 that in turn strikes the inside of reflector 80. The light ring is reflected and converged and then diverges, as shown by arrows 11, to strike a polished surface 86 of cone 85 placed on an axis with the reflected beam. The ring of light after reflection from surface 86 of cone 85 is directed so as to be parallel to the ground, thereby enabling its use for level referencing purposes. With the structure fabricated with a bob, by its nature, the unit would be self leveling.

Other light altering devices may be constructed with monofilament fish line, single or multiple optical fibers, thin wires, or numerous other thin filament materials. These elements may be operated in vacuum, air, and be used in liquids, plastics, and glass and employed with or without cladding and/or covering materials. It is also contemplated that the cross sectional shapes of the aforementioned light altering devices may be altered for special purposes and that reflective coatings may also be applied to the light altering devices for special usages, for example, to improve emerging beam uniformity and efficiency.

It should now be understood that a low cost, radiant energy altering device has been disclosed that is a few millimeters in diameter and changes an input beam of radiant energy into an output in a disc pattern. The radiant energy altering device is low in cost and can comprise a variety of materials and geometries, including hollow glass tubes, fiber optic rods, tubes within tubes, etc. The altering device is not limited to input of laser energy, be it coherent or incoherent, multiple wavelength, i.e., broadband, colored or white, point or line source.

While the invention has been described in conjunction with the specific embodiments outlined above, it is evident that many alternatives, modifications and variations will be apparent to those skilled in the art. Accordingly, the preferred embodiments of the invention as set forth above are intended to be illusive and not limiting. Various changes may be made without departing from the spirit and scope of the invention as defined herein.

What is claimed is:

1. A line producing apparatus, comprising:
   a laser source adapted to produce radiant energy; and
   a laser output altering device, and wherein radiant energy projected from said laser source orthogonally into said laser output altering device emerges from said laser output altering device in a predetermined plane, and wherein said laser output altering device is a hollow tube within a hollow tube.

2. The line producing apparatus of claim 1, wherein said radiant energy emerging from said laser output altering device is in a disc shaped pattern.

3. An apparatus adapted to create an optical line, comprising:
   a laser source; and
   a device for receiving radiant energy from said laser source, said device being adapted such that radiant energy projected from said laser source orthogonally into said device emerges from said device in an outward pattern to form an optical line in a predetermined plane, and wherein said device is a hollow tube within a hollow tube.

4. A method for creating a 360° circle of ever emerging light, comprising the steps of:
   providing a laser source; and
   providing a device for receiving radiant energy from said laser source, said device being adapted such that radiant energy projected from said laser source orthogonally into said device emerges from said device in an outward pattern to form a line in a predetermined plane, and wherein said device is a bundled capillary array.

* * * * *